(12) United States Patent
Laico et al.

(10) Patent No.: US 12,172,361 B2
(45) Date of Patent: Dec. 24, 2024

(54) DEVICE FOR OPTICAL INSPECTION OF PARISONS

(71) Applicant: SACMI COOPERATIVA MECCANICI IMOLA SOCIETA' COOPERATIVA, Imola (IT)

(72) Inventors: Donato Laico, Imola (IT); Simone Nigro, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 639 days.

(21) Appl. No.: 17/413,170

(22) PCT Filed: Dec. 12, 2019

(86) PCT No.: PCT/IB2019/060699
§ 371 (c)(1),
(2) Date: Jun. 11, 2021

(87) PCT Pub. No.: WO2020/121239
PCT Pub. Date: Jun. 18, 2020

(65) Prior Publication Data
US 2022/0048237 A1    Feb. 17, 2022

(30) Foreign Application Priority Data
Dec. 14, 2018    (IT) ................. 102018000011107

(51) Int. Cl.
*G06T 7/00*    (2017.01)
*B29C 49/80*    (2006.01)
*B29C 49/78*    (2006.01)

(52) U.S. Cl.
CPC .............. *B29C 49/80* (2013.01); *G06T 7/001* (2013.01); *B29C 49/78* (2013.01);
(Continued)

(58) Field of Classification Search
CPC ... B29C 49/80; B29C 49/78; B29C 2049/787; B29C 49/06; B29C 49/4238;
(Continued)

(56) References Cited

U.S. PATENT DOCUMENTS 5,926,268 A * 7/1999 Bonewitz ........... G01N 21/9036
356/240.1
9,638,579 B2 † 5/2017 Hermle
(Continued)

FOREIGN PATENT DOCUMENTS

DE    102006047150 A1    4/2008
EP    2976204 B1    6/2017

OTHER PUBLICATIONS

International Search Report issued in International Patent Application No. PCT/IB2019/060699 dated Jun. 24, 2020.
(Continued)

*Primary Examiner* — Van D Huynh
(74) *Attorney, Agent, or Firm* — United IP Counselors, LLC

(57) ABSTRACT

A device (1) for optical inspection of parisons (2) comprises: an illuminator (3) configured to emit a beam of light directed at a parison (2) located at an inspection position (10); a detector (4) configured to capture an image (10) of the parison (2) interposed between the illuminator (3) and the detector (4), where the illuminator (3) includes an emission-polarizing filter (32) configured to generate a polarized light beam, and where the detector (4) includes a receiving polarizing filter (41) configured to receive the polarized light beam.

26 Claims, 5 Drawing Sheets

(52) U.S. Cl.
CPC ............... *G06T 2207/20081* (2013.01); *G06T 2207/20084* (2013.01); *G06T 2207/30164* (2013.01)

(58) Field of Classification Search
CPC ...... B29C 2049/023; B29C 2049/7876; B29C 2949/0715; G06T 7/001; G06T 2207/20081; G06T 2207/20084; G06T 2207/30164; B29K 2067/003; B29L 2031/7158; G01N 21/01; G01N 21/8806; G01N 21/8851; G01N 2021/8848; H04N 7/18
See application file for complete search history.

(56) References Cited

U.S. PATENT DOCUMENTS

| | | | | |
|---|---|---|---|---|
| 11,282,185 | B2* | 3/2022 | Nogami | G06V 10/82 |
| 2006/0232769 | A1* | 10/2006 | Sugihara | G01N 21/95692 |
| | | | | 356/237.2 |
| 2010/0225908 | A1* | 9/2010 | Kwirandt | G01N 21/9081 |
| | | | | 356/239.4 |
| 2011/0310243 | A1* | 12/2011 | Fuhrmann | G01N 21/9036 |
| | | | | 348/92 |
| 2017/0129157 | A1* | 5/2017 | Derrien | B29C 49/78 |
| 2018/0311883 | A1* | 11/2018 | Moffitt | B29C 49/12 |
| 2018/0322623 | A1* | 11/2018 | Memo | G06N 3/084 |

OTHER PUBLICATIONS

Written Opinion issued in International Patent Application No. PCT/IB2019/060699 dated Jun. 24, 2020.

\* cited by examiner
† cited by third party

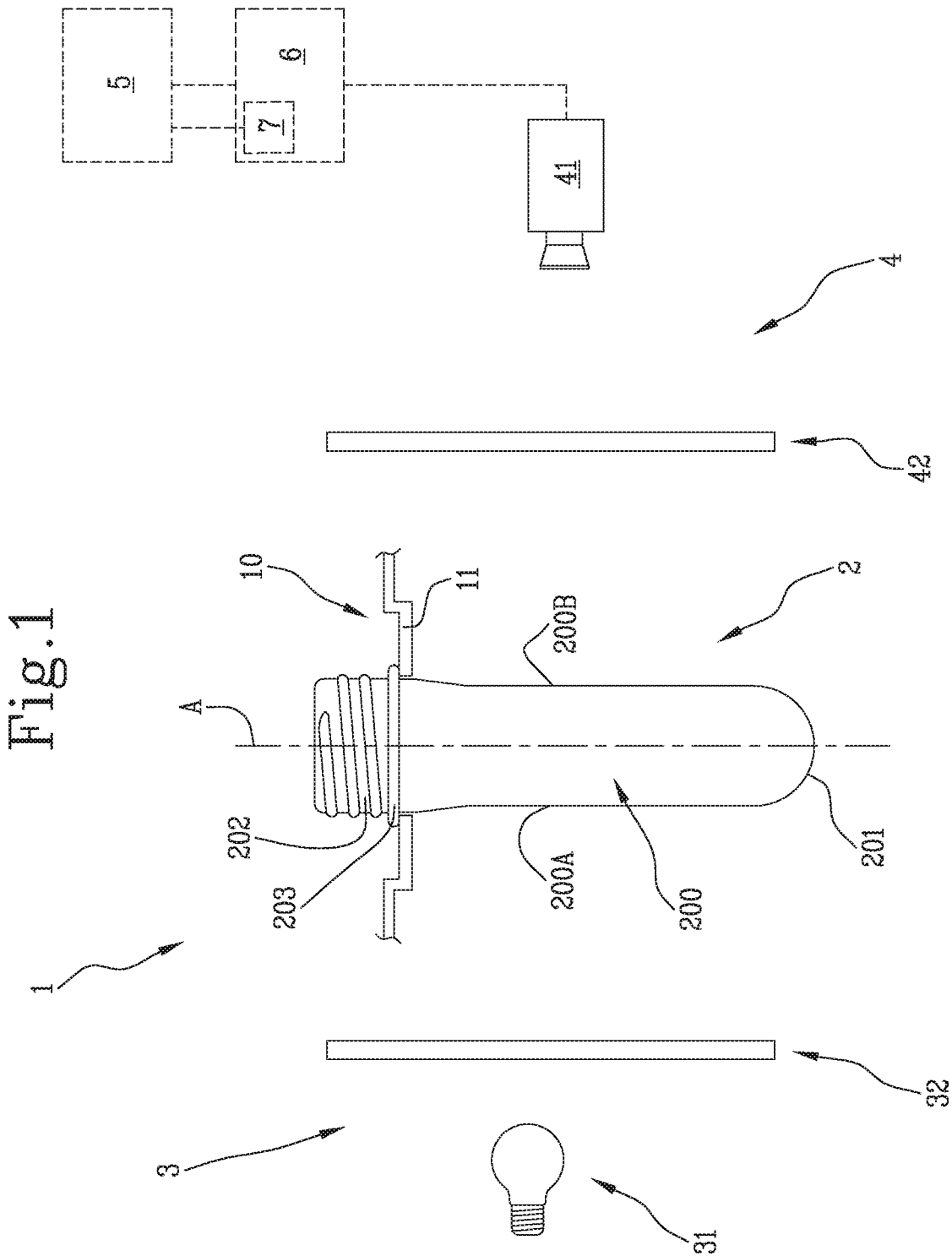

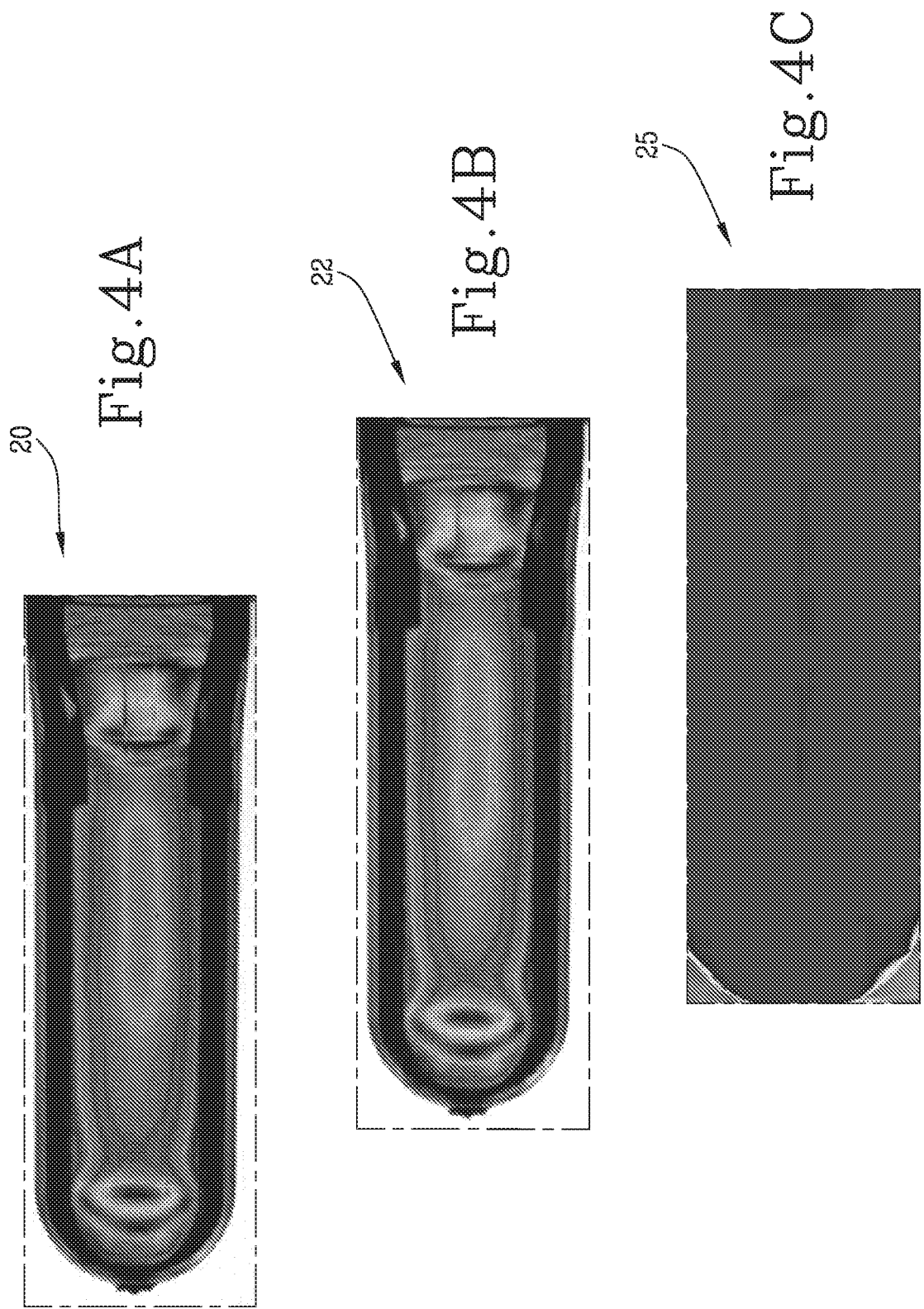

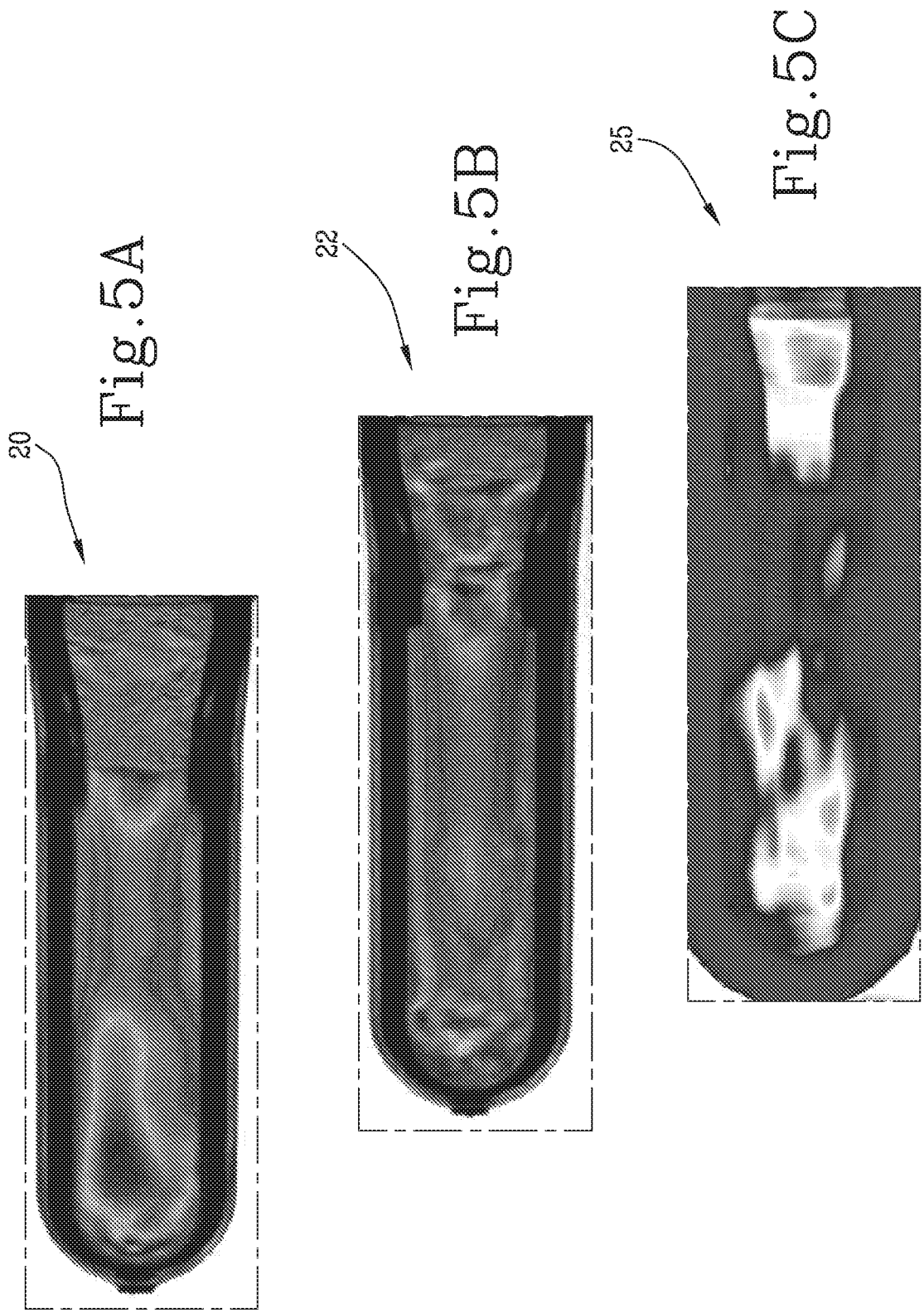

DEVICE FOR OPTICAL INSPECTION OF PARISONS

TECHNICAL FIELD

This invention relates to a device for the optical inspection of parisons. Lines for the production of plastic containers, specifically bottles, commonly comprise a moulding machine, configured to form parisons from PET (polyethylene terephthalate) and a blow-moulding machine configured to blow the parisons in moulds to make the containers. Some preforms may be flawed, for example by irregular thickness, holes, blisters or extraneous bodies; these flaws must be detected by a quality check intended to promptly remove the defective parisons from the production line.

BACKGROUND ART

Known from patent document EP2976204B1 is a system for optically checking parisons configured to check the parisons while they are being transported by a conveyor towards a collection vessel; the system comprises a camera and a light source, disposed in such a way that the light source illuminates the parisons from behind and the camera captures an image of each parison from the front.

Others inspection systems are disclosed in the following patent documents: US2017/129157A1, DE102006047150A1, US2018/311883A1. One limitation of prior art optical inspection systems is that they limit the quality check to image features that are visible to the camera (such as blistering, for example) but are unable to detect internal defects of the material such as irregular residual stresses in the polymer chains of the PET.

In addition, prior art systems detect the defective parisons on the basis of similarity with images of other defective parisons stored in a database. These systems therefore have to be initialized with a database containing all the possible defects that need to be detected; it is, however, rare to find a complete and exhaustive database of this kind because defects vary widely and defective parisons constitute only a small percentage of the parisons made.

Generally speaking, therefore, prior art systems have limited reliability in identifying defective parisons.

DISCLOSURE OF THE INVENTION

The aim of this disclosure is to provide a device and a method for optical inspection of parisons to overcome the above mentioned disadvantages of the prior art. Another aim of this disclosure is to provide a method for processing an image of a parison to overcome the above mentioned disadvantages of the prior art.

These aims are fully achieved, according to this disclosure, by the device for optical inspection of parisons, by the method for optical inspection of parisons and by the method for processing an image of a parison as characterized in the appended claims.

More specifically, this disclosure relates to a device for optical inspection of parisons (or preforms) or other objects made of plastic material (such as caps or capsules, for example) or metallic (such as lids); in this regard, it is understood that the rest of this description, made with reference to parisons, is also applicable to other objects made of plastic or metallic material. The term "parison" is used to denote an intermediate product in the process for the production of plastic containers such as, for example, beverage bottles. More specifically, parisons are formed by moulding the plastic material (typically injection or compression moulding) and, at a later stage, are expanded by blow-moulding to produce the finished containers. Parisons are made of plastic material, preferably PET (polyethylene terephthalate).

The device for optical inspection of parisons according to this disclosure comprises an illuminator. The illuminator includes a light source configured to emit a beam of light directed at a parison located at an inspection position.

In one embodiment, the device includes an inspection pocket configured to receive the parison at the inspection position. In another embodiment, the inspection pocket configured to receive the parison at the inspection position is part of a line which, among other things, includes the device.

The device comprises a detector. The detector includes a camera. The camera (that is, the detector) is configured to capture an image of the parison located at the inspection position.

In an embodiment, the light source is configured to emit the light beam continuously. In an embodiment, the light source is stroboscopic and is configured to emit the light beam at predetermined emission intervals (each emission interval corresponds to the time taken to feed a parison to the inspection position).

In an embodiment, the camera is configured to capture the image at predetermined capture intervals (each capture interval corresponds to the time taken to feed a parison to the inspection position); if the light source is stroboscopic, the emission intervals correspond to (that is, are equal to) the capture intervals.

At the inspection position, the parison is operatively interposed between the illuminator and the detector. That way, the illuminator lights the parison from a first side (for example, from the front), while the detector captures an image of the parison from a second side, opposite to the first (for example, from the back); the detector thus captures a backlit image of the parison.

Preferably, the illuminator (or the device) includes an emission-polarizing filter (or first polarizing filter). The emission-polarizing filter is configured to intercept the light beam emitted by the light source. The emission-polarizing filter is configured to generate a corresponding polarized light beam from the light beam emitted by the light source.

Preferably, the detector (or the inspection device) includes a receiving polarizing filter (or second polarizing filter).

Preferably, at the inspection position, the parison is operatively interposed between the emission-polarizing filter and the receiving polarizing filter.

The receiving polarizing filter is configured to receive the polarized light beam. More specifically, the receiving polarizing filter is configured to receive the beam of light polarized by the emission-polarizing filter and refracted by the parison and to generate a second polarized light beam. The camera thus receives the second polarized light beam.

Since the material the parison is made of (preferably PET) is characterized by birefringence, when the polymer chains inside it are oriented and it is subjected to stress, the polarized light (from the first polarizing filter) which strikes it is refracted according to refractive indices which differ according to the stress. More specifically, the light rays which strike the parison are broken down into two rays which oscillate in perpendicular planes and the second polarizer allows only some of the components to pass, bringing them into the same plane and creating interferences; zones which are subjected to the same stress will therefore have the same interferences and thus the same colour, whilst zones subjected to different stresses will have different colours. The camera thus captures an image showing a colour pattern representing an internal distribution of the stress in the parison.

It is provided that the first and the second polarizing filter are arranged on parallel planes. It is provided that the first polarizing filter (or emission filter) is a linear polarizing filter. In particular, the first polarizing filter (or emission filter) is configured to polarize the light in a first polarizing direction. It is provided that the axis if the parison, at the inspection position, is oriented parallel to the first polarizing direction (of the emission filter). It is here meant, as "axis of the parison", the central symmetry axis of the parison, about which the lateral wall of the parison extends.

It is provided that the polarizing filter (or receiving filter) is a linear polarizing filter; the second polarizing filter (or receiving filter) is configured to polarize the light in a second polarizing direction. Preferably, both the first and second polarizing filers are linear polarizing filters. In an embodiment, the first polarizing direction and the second polarizing direction are parallel to each other (and in this case, the resulting light is white). In an embodiment, the first polarizing direction and the second polarizing direction are different to each other. In particular, the first and second polarizing directions may define an angle comprised between 5° and 50°; for instance, the first and second polarizing directions may be perpendicular to each other (and in this case, the resulting light is black). In a further example, the first and second polarizing directions may define an angle of 45°. In a further example, the first and second polarizing directions may define an angle of 30°. In a further example, the first and second polarizing directions may define an angle of 15°.

In other embodiments, the first and/or the second polarizing filters are circular polarizing filters.

In other embodiments, the first and second polarizing filters are not provided and the camera thus captures a monochrome, backlit image of the parison (with light and dark zones).

It is provided that the parisons are fed singularly, namely one after the other, at the inspection position. For instance, it is provided that the inspection device is part of an apparatus (which may be itself object of the present disclosure), including a conveyor configured to transport in succession the parisons to be inspected along an inspection path (wherein, within the inspection path, the inspection position is defined). The conveyor may include a suction belt defining a plurality of apertures and configured to contact an upper edge of the parisons, to create a negative pressure (that is, a vacuum), the internal cavity of the parisons. Them the suction belt is configured to support the parisons through said negative pressure. The suction belt is configured to move the parison along the inspection path, and to position them, one after the other, in the inspection position. The illuminator and the emission polarizing filter may be arranged on a first side of the inspection path (namely, of the suction belt); the camera and the receiving polarizing filter may be arranged on a second side of the inspection path (namely, of the suction belt), opposite to the first side; therefore, the parison, supported by the suction belt, is interposed between the emission polarizing filter and the receiving polarizing filter.

In an embodiment, the device comprises a processing unit. The processing unit is connected to the detector.

The processing unit includes a memory that contains reference data. The processing unit includes a processor, programmed to process the image captured by the detector based on the reference data, in order to derive a diagnostic indication regarding the defectiveness of the parison.

In an embodiment, the processor may include one or more criteria for the identification of defective parisons, based on one or more threshold values stored in the memory. For example, the processor may be configured to identify a defective parison in the case where the brightness of the image captured by the camera is above a predetermined threshold value (in effect, an image with high brightness indicates a parison with very thin walls) and/or in the case where the image presents a sharp colour transition, above a certain threshold).

In a preferred embodiment, the processing unit is configured to process the image captured by the detector (based on the reference data), in order to derive values of a plurality of image features from the captured image; this process encodes the image code (by transforming or compressing the image according to a predetermined algorithm, or one derived by the processing system in a self-learning step). Thus, the processing unit is configured to assign a value to each feature of the plurality of image features. In an embodiment, encoding the image includes reducing the size of the image (for example, the plurality of image features may include 500 features).

These image features represent the image. Thus, the processing unit is configured to extract from the image a plurality of values assigned to a corresponding plurality of image features and to reduce the image to these representative (or significant) values of the image.

In an embodiment, the processing unit is configured to process the values of the plurality of image features (based on the reference data) in order to derive a diagnostic indication regarding the defectiveness of the parison.

In an embodiment, the processing unit is configured to classify the image based on the values of the plurality of image features; for example, for each image feature, the memory may include one or more typical values of a good (that is, defect-free) parison and one or more typical values of a defective parison, and the processing unit may be configured to identify a parison as defective if the at least one value of an image feature is reasonably close (above a certain threshold) to the respective typical value of the defective parison, and/or if a certain combination (for example, a multiplication) of image features is reasonably close (above a certain threshold) to a reference value for that combination, typical of a defective parison.

For example, the image features may include the presence or absence of certain colours or combinations of colours, and/or the presence or absence of a certain symmetry and/or the light intensity at certain points; the processing unit may be configured to identify a parison as defective if the image presents a certain colour or combination of colours, or has (or does not have) a certain symmetry or the light intensity at certain points is greater or less than a threshold value.

In an embodiment, the processing unit is configured to generate an image reconstructed from the values of the plurality of image features (and based on the reference data). In an embodiment, the processing unit is configured to derive the diagnostic indication regarding the defectiveness of the parison as a function of comparing the image captured by the detector with the image that is reconstructed (on the basis of the reference data).

More specifically, the processing unit is configured to compare the image captured by the detector with the reconstructed image and to derive a similitude parameter representing a similarity between the image captured by the detector and the reconstructed image. The processing unit is configured to compare the similitude parameter with a predetermined threshold value (which may itself be part of the reference data) and to derive the diagnostic indication as a function of comparing the predetermined threshold value with the similitude parameter. For example, the processing unit may be configured to identify a parison as good if the similitude parameter is above a certain similarity threshold. Thus, the processing unit is configured to identify a parison as good if the reconstructed image is sufficiently similar to the starting image captured by the camera.

In effect, the processing unit is trained to process the image (that is to say, to encode it, derive the values of the plurality of image features and generate the reconstructed image therefrom) on the basis of parisons which are good—that is, defect-free. The processing unit may be trained by a self-learning system, as described below, or it may be a commercially available, pre-trained unit. If the parison is good, the processing unit is able to process its image correctly and to generate a reconstructed image that is similar to the original image; if the parison is defective, on the other hand, the processing unit, which is trained on good parisons, is unable to reconstruct the image correctly and, as a result, generates a reconstructed image that is significantly different from the original.

Therefore, it is provided that the processing unit is trained with samples of objects of a single typology (for instance, of defect-free typology); then, the processing unit will be able to distinguishing among at least two typologies of objects (for instance, with-defect typology and defect-free typology).

In an embodiment, the device comprises a self-learning system.

The self-learning system is, in one embodiment, integrated in the processing unit. The self-learning system is, in one embodiment, connected to the processing unit. The self-learning system is, in one embodiment, connected to the memory.

The self-learning system is configured to receive as input a plurality of images captured by the detector for a corresponding plurality of parisons.

The self-learning system is configured to encode each image of the plurality of images captured by the detector for a corresponding plurality of parisons (based on the reference data) to derive from each image of the plurality of images corresponding values of a plurality of image features. Preferably, the self-learning system is configured to encode the images on the basis of a predetermined criterion (which may itself be part of the reference data).

The self-learning system is configured to generate for each image of the plurality of images a corresponding image reconstructed from the corresponding values of the plurality of image features (and based on the reference data).

The self-learning system is configured to compare each image of the plurality of images with the corresponding reconstructed image in order to derive, for each image, a similitude parameter representing a similarity between the image captured by the detector and the corresponding reconstructed image.

The self-learning system is configured to update the reference data as a function of the similitude parameter in such a way that the similitude parameter is lower than a predetermined threshold value (if the similitude parameter is directly proportional to the similarity between the images; otherwise, if the similitude parameter is inversely proportional to the difference between the images, in such a way that it is greater than a predetermined threshold value). In an embodiment, the predetermined threshold value is itself part of the reference data. Preferably, the self-learning system is configured to update the reference data (iteratively) as a function of the similitude parameter for each image of the plurality of images.

In a preferred embodiment, the self-learning system is configured to update the plurality of image features (preferably in combination with the reference data) as a function of the similitude parameter and of a predetermined threshold value. More specifically, the reference data and/or the plurality of image features are updated in such a way that, for each image of the plurality of images, the similitude parameter is greater than a predetermined threshold value (if the similitude parameter is directly proportional to the similarity between the images).

On the other hand, if the similitude parameter is directly proportional to a difference between the images (that is, inversely proportional to their similarity), the self-learning system is configured to update the reference data and/or the image features in such a way that the similitude parameter is less than a predetermined threshold value.

In a preferred embodiment, the predetermined criterion includes (or is defined by) a maximum number (or a predetermined number) of features for the plurality of image features. The predetermined criterion ensures that the system does not simply perform a function of identifying the image captured, independently of the defectiveness of the parison.

Thus, in a preferred embodiment, the self-learning system is configured to determine both the image features and the reference data as a function of the images captured by the detector.

This system performs particularly well if the images captured represent good parisons; that way, the system learns how to encode and reconstruct the images of good parisons (that is, the reference data to use for encoding, the image features to be extracted—because they represent good parisons—and the reference data to be used for reconstruction). Then, when the processing system has to encode and reconstruct a defective parison, it will not succeed and will generate a reconstructed image that differs significantly from the starting one.

In another embodiment, the predetermined criterion includes (or is defined by) the plurality of image features (that is, the features for which values are extracted).

In an embodiment, the self-learning system includes classifiers. The classifiers are configured to classify the captured images based on parameters such as, for example, colour, colour gradient, standard deviation of colour in a neighbourhood of a pixel, mean colour in a neighbourhood of a pixel, or others. Specifically, the classifiers may be programmed to build a histogram representative of a distribution of the colours in the image, and to classify the image based on a symmetry and/or uniformity of the colours in said histogram. In an embodiment, it is provided that the parameters may be pre-set in the classifiers (namely, explicitly defined). It is provided, for example, that the classifiers are of "one-class" type. The classifiers may be configured to select, among a plurality of pre-set parameters, one or more parameters to be used during inspection (this selection may be performed by the classifiers during the learning step).

In an embodiment, the classifiers are decision-making branches. In particular, it is provided that the "one-class" classifiers are decision-making branches of "random forest" type. It is observed that these classifiers may be trained (solely) with images of objects without any defects (since the classifier belongs to the "one-class" typology).

In a preferred embodiment, the self-learning system includes neural networks. In particular, the self-learning system may include convolutional neural networks.

By "convolutional neural networks" is meant neural networks configured to encode the image through a series of convolution steps alternated with a series of pooling steps to derive the values of the plurality of image features. In the convolution steps, convolution filters (whose values are part of the reference data) are applied to the image (that is, to the matrix of pixels representing each colour of the image) in order to derive a transformed image; in the pooling steps, a dimension of the transformed image is reduced, for example by a maximum or minimum or mean mathematical operation between adjacent pixels. The convolution and pooling steps are thus used to obtain the values of the plurality of image features.

In an embodiment, the neural networks are pre-trained to extract (that is, derive) the values of the plurality of image features; in an embodiment, the neural networks may include known neural networks (or parts thereof) configured to identify subjects in an image (for example, based on a dataset "ImageNet").

In an embodiment, the convolutional neural networks are configured to classify the image based on the values of the plurality of image features, compared with reference values (which form part of the reference data). In one embodiment, the image is classified as representing a good parison or a defective parison; in another embodiment, the image is classified as representing a good parison or a parison having a specific defect. In an embodiment, the neural networks include "anomaly-detection" classifiers or "fully-connected" networks to classify the image based on the values of the plurality of image features. For example, to extract (that is, derive the values of the image features), a part of a known network based on a dataset like "ImageNet"—the network including convolution and pooling (hence a pre-trained network)—is used, and to classify the image, a "fully-connected" network is used which is trained by the self-learning system (preferably with examples of good parisons and examples of defective parisons) and which is capable of distinguishing a good parison from a defective parison on the basis of the values of the image features.

In an embodiment, the learning system includes neural networks of the type known as "Generative Adversarial Networks" (GANs); Generative Adversarial Networks include a generator and a discriminator; the generator uses the values of the plurality of image features (obtained with the convolution step from a real image captured by the detector) to generate a corresponding reconstructed image and passes it on to the discriminator; the discriminator tries to distinguish whether the image it receives is real—that is, captured by the detector—or reconstructed, and sends feedback to the generator; based on the feedback from the discriminator, the generator learns to generate reconstructed images that are as similar as possible to the real images (such that the discriminator will consider them real). During training, the GAN preferably receives images of good parisons; thus, when the reference data (and the image features) determined by the self-learning system are used by the processing system to inspect the parisons, the discriminator recognizes as reconstructed images only those relating to defective parisons.

In a preferred embodiment, the self-learning system includes an "autoencoder" convolutional neural network. In an embodiment, the reference data include a first reference data set and a second reference data set. The first reference data set relates to a series of convolution steps (for example, it includes a plurality of convolution filters); the second reference data set relates to a series of upsampling steps. In particular, the second reference data set may be related to a series of deconvolution steps (for example, it includes a plurality of deconvolution filters).

Autoencoder neural networks are configured to extract (that is, derive) values of the plurality of reference features from the image, based on the first reference data set relating to the series of convolution steps and to reconstruct the image (that is, generate the reconstructed image) using the values of the plurality of image features, based on the second reference data set relating to the series of deconvolution steps.

In the embodiment including an autoencoder network, the learning system is configured to receive as input a plurality of images of good parisons to derive therefrom corresponding values of the image features, based on the first reference data set; the learning system is configured to generate a plurality of reconstructed images using the values of the image features and based on the second reference data set relating to the deconvolution steps; lastly, the self-learning system is configured to compare the plurality of reconstructed images with the corresponding plurality of original images and to update the reference data (specifically, the first reference data set or the second reference data set or both the first and the second reference data sets combined) so as to minimize a difference between the original images captured by the detector and the corresponding reconstructed images. More specifically, in an embodiment, the self-learning system is configured to derive, for each image, a similitude parameter (for example, calculated with one of the following functions, or with a combination of two or more of the following functions: norm l1, norm l2, "SSIM" Structural Similarity Index, "PSNR" peak signal-to-noise ratio, "HaarPSI" Haar wavelet-based perceptual similarity index) and to minimize the similitude parameter (that is, bring it below a certain threshold) if the similitude parameter is directly proportional to a difference between the images, or vice versa, to maximize it (that is, bring it above a certain threshold) if the similitude parameter is directly proportional to a similarity between the images. In the embodiment including an autoencoder network, the learning system is configured to update, in combination with the first and second reference data sets, the filters of the network (and, consequently, the plurality of image features), so as to identify the image features that best represent images of defect-free parisons and to jointly identify the convolution steps for deriving them and the deconvolution steps to generate the reconstructed image using those image features. Preferably, the self-learning system comprising an autoencoder network is constrained to at least one predetermined criterion (that is, a constraint) when encoding the image; for example, the criterion may regard a maximum number of image features which may be identified for that plurality of image features. Thus, in practice, the encoding operation constitutes a compression of the image.

Thus, in an embodiment, the self-learning system is configured to learn the reference data and the image features which the processing system then uses to inspect the parisons. In the embodiment including an autoencoder network, the self-learning system is trained with a plurality of parisons that are good (defect-free); thus, the self-learning system determines the reference data and the image features used to reconstruct the images of the good parisons correctly (that is, with a high level of similarity between the images captured by the detector and the corresponding reconstructed images); when it applies those reference data and image features to a defective parison, the reconstructed image is significantly different from the corresponding captured image and the processing system, when it compares them, identifies the parison as defective.

It is observed that the comparison between the captured image and the reconstructed image is performed both during network learning (or training) and during inspection; the similitude parameter which is used for the training may be different from the similitude parameter which will be used during inspection. In particular, the "PSNR", "HaarPSI" functions are preferably used during inspection, but not during training. For instance, it is provided to use, for the training, the "SSIM" function or the norm l1 function or the norm l2 function, and, for the inspection, the "PSNR" function or the "HaarPSI" function.

Preferably, the self-learning system (or the processing system) includes a first neural (sub-)network responsible for encoding the images in order to derive the values of the image features and a second neural (sub-)network responsible for decoding the values of the image features in order to reconstruct the image; the first and second neural (sub-) networks are trained jointly. The first and second neural (sub-)networks may be parts of a single neural network.

This disclosure also provides a line for making containers from thermoplastic material.

In an embodiment, the line comprises a moulding machine configured to make parisons. In an embodiment, the moulding machine is an injection moulding machine. In an embodiment, the moulding machine is a compression moulding machine (which may be a rotary machine).

In an embodiment, the line comprises a thermal conditioning unit to heat and/or cool the parisons. For convenience of description, the thermal conditioning unit is hereinafter referred to as a "heating oven" without thereby limiting the scope of the disclosure. The heating oven is configured to receive the parisons feeding out of the moulding machine and is equipped with heating means for heating the parisons.

In an embodiment, the line comprises a blow-moulding machine configured to receive the parisons and to blow-mould them in moulds to make the containers. Preferably, the blow-moulding machine is configured to receive the parisons heated in the heating oven. The oven might be integrated in the blow-moulding machine.

In an embodiment, the blow-moulding machine and the parison moulding machine might be located in different lines (even installed in separate factories) working in conjunction to make containers of thermoplastic material: in effect, the moulding machine makes parisons which are fed into the line that includes the blow-moulding machine. The oven is preferably integrated in the line that includes the blow-moulding machine, upstream of the blow-moulding machine to heat the parisons before blow-moulding them.

In an embodiment, the line comprises a storage unit (which may be automatic) to receive the parisons and store them; the storage unit is configured to receive the parisons from the moulding machine and to feed them to the blow-moulding machine—or to the oven.

In an embodiment, the line comprises a device for optical inspection of parisons according to one or more aspects of this disclosure. The optical inspection device is located in the line downstream of the moulding machine. The optical inspection device is located in the line upstream of the blow-moulding machine. In an embodiment, the optical inspection device is located downstream of the moulding machine and upstream of the oven. In an embodiment, the optical inspection device is located downstream of the oven and upstream of the blow-moulding machine. The fact that the device is located upstream of the blow-moulding machine allows identifying a defective parison before it explodes during blow-moulding on account of its anomalous stress profile. In an embodiment, the optical inspection device might be positioned in the storage unit or on a conveyor connecting the storage unit to other parts of the line.

In an embodiment, the optical inspection device is located on the line in such a way as to inspect the parisons at a temperature of between 30 and 70 degrees Celsius (preferably between 50 and 60 degrees Celsius). The parisons may be at this temperature when they exit the moulding machine, for example.

In an embodiment, the optical inspection device is located on the line in such a way as to inspect the parisons at an ambient temperature (for example, between 5 and 30 degrees Celsius). The parisons may be at ambient temperature if they re stored or cooled after moulding.

Preferably, the optical inspection device is located on the line in such a way as to inspect the parisons at a temperature below 60 degrees Celsius (preferably below 50 degrees Celsius); in effect, at higher temperatures, the parisons might be subject to deformation which could alter their stress profiles.

In an embodiment, the optical inspection device is integrated in the oven. If the optical inspection device is integrated in the oven (preferably upstream of the heaters—that is, at the entrance to the oven) it is possible to take advantage of the positioning of the parisons inside the oven, singulated and ordered.

In other embodiments, the optical inspection device according to this disclosure is located off line, integrated in a high-speed review machine or in a low-speed sampling machine.

This disclosure also relates to a method for optical inspection of parisons. The optical inspection method comprises a step of emitting, with an illuminator, a beam of light directed at a parison located at an inspection position. The optical inspection method comprises a step of capturing, with a detector, an image of the parison located at the inspection position. At the inspection position, the parison is operatively interposed between the illuminator and the detector. The image captured is thus a backlit image.

In an embodiment, the optical inspection method comprises a step of generating a polarized light beam by intercepting the beam of light emitted by the illuminator on an emission-polarizing filter interposed between the illuminator and the parison.

In an embodiment, the optical inspection method comprises a step of receiving the polarized light beam on a receiving polarizing filter. At the inspection position, the parison is operatively interposed between the emission-polarizing filter and the receiving polarizing filter.

In an embodiment, the parison is made of a material which includes polymer chains (preferably PET). In an embodiment, the image captured by the detector includes a colour pattern representing a stress which the polymer chains of the PET are subjected to.

In an embodiment, the optical inspection method comprises a step of processing the image (using a processing system). In an embodiment, in the step of processing, the image captured by the detector is processed on the basis of reference data contained in a memory. In an embodiment, the step of processing includes deriving the diagnostic indication regarding the defectiveness of the parison.

In an embodiment, the step of processing includes a sub-step of encoding the image captured by the detector, based on reference data, in order to derive values of a plurality of image features from the image.

In an embodiment, the step of processing includes processing the plurality of image features to derive the diagnostic indication regarding the defectiveness of the parison. More specifically, in an embodiment, the step of processing includes a sub-step of generating an image reconstructed from the values of the plurality of image features and based on the reference data. In an embodiment, the step of processing includes a sub-step of deriving the diagnostic indication regarding the defectiveness of the parison as a function of comparing the image captured by the detector with the reconstructed image.

In an embodiment, the method comprises a step of self-learning (performed by a self-learning system connected to the processing system). In an embodiment, the step of self-learning comprises a sub-step of capturing a plurality of images for a corresponding plurality of parisons. In an embodiment, the step of self-learning comprises a sub-step of encoding each image of the plurality of images based on the reference data, including deriving, from each image of the plurality of images, corresponding values of a plurality of image features according to a predetermined criterion (which may include a constraint on the maximum number of image features of the plurality of image features). In an embodiment, the step of self-learning comprises a sub-step of generating for each image of the plurality of images, a corresponding image reconstructed from the corresponding values of the plurality of image features and based on the reference data. In an embodiment, the step of self-learning comprises a sub-step of comparing each image of the plurality of images with the corresponding reconstructed image and deriving a corresponding similitude parameter representing a similarity between the image captured by the detector and the corresponding reconstructed image. In an embodiment, the step of self-learning comprises a sub-step of updating the reference data and/or the plurality of image features as a function of the similitude parameter and of a predetermined threshold value. More specifically, the reference data and the plurality of image features are updated in such a way that the similitude parameter is less than (or greater than) the predetermined threshold value.

In an embodiment, the images of the plurality of images captured by the camera during the step of self-learning represent a corresponding plurality of defect-free parisons. The fact that the self-learning system does not need to receive images of defective parisons as input is very advantageous because the defective parisons are difficult to find.

Preferably, the emission-polarizing filter and the receiving polarizing filter are oriented relative to each other according to a predetermined orientation (for example, parallel or perpendicular) which is the same in the step of self-learning and in the step of processing.

In an embodiment, the method comprises a step of feeding the parisons of the plurality of parisons to the inspection position one at a time (in succession). In an embodiment, the parisons are fed according to a predetermined orientation relative to the emission-polarizing filter and relative to the receiving polarizing filter. That orientation is the same in the step of self-learning and in the step of processing. The image of each parison of the plurality of parisons is captured when the parison is at the inspection position.

In an embodiment, the processor is configured to process the images oriented at random (for example, rotating them to bring them to a predetermined orientation); thus, in an embodiment, the device is invariant to the orientation of the parisons.

In an embodiment, the processing system is configured to process the image of the parison in real time (as soon as the image is captured). In one embodiment, when the device provides the diagnostic indication identifying the parison as defective, the line is configured either to stop to allow an operator to remove the defective parison or to itself remove the defective parison.

In another embodiment, the processing system is configured to capture the image of the parison to process it in post processing mode. In this case, the system is configured to correlate each image with the respective parison so as to be able to identify the parison whose image produced the diagnostic, defective parison indication.

This disclosure also relates to a method for processing an image of a parison. In an embodiment, the image processing method includes a step of encoding the image, including deriving values of a plurality of image features. In an embodiment, the image processing method includes a step of generating a reconstructed image as a function of the plurality of image features. In an embodiment, the image processing method includes a step of deriving the diagnostic indication regarding the defectiveness of the parison as a function of comparing the image captured by the camera with the reconstructed image.

In an embodiment, the image processing method includes a step of self-learning (according to one or more aspects described in this disclosure).

This disclosure also relates to a computer program (software) comprising operating instructions configured to carry out the steps of the processing method according to one or more aspects described in this disclosure (when performed by a processor, specifically the processing unit of the device according to one or more aspects described in this disclosure).

BRIEF DESCRIPTION OF DRAWINGS

These and other features will become more apparent from the following detailed description of a preferred embodiment, illustrated by way of non-limiting example in the accompanying drawings, in which:

FIG. 1 illustrates an optical inspection device according to this disclosure;

FIGS. 4A, 4B and 4C show, for a defect-free parison, an image captured by a camera, a reconstructed image and a comparison between the captured image and the reconstructed image, respectively;

FIGS. 5A, 5B and 5C show, for a defective parison, an image captured by a camera, a reconstructed image and a comparison between the captured image and the reconstructed image, respectively;

DETAILED DESCRIPTION OF PREFERRED EMBODIMENTS OF THE INVENTION

Figure 3:
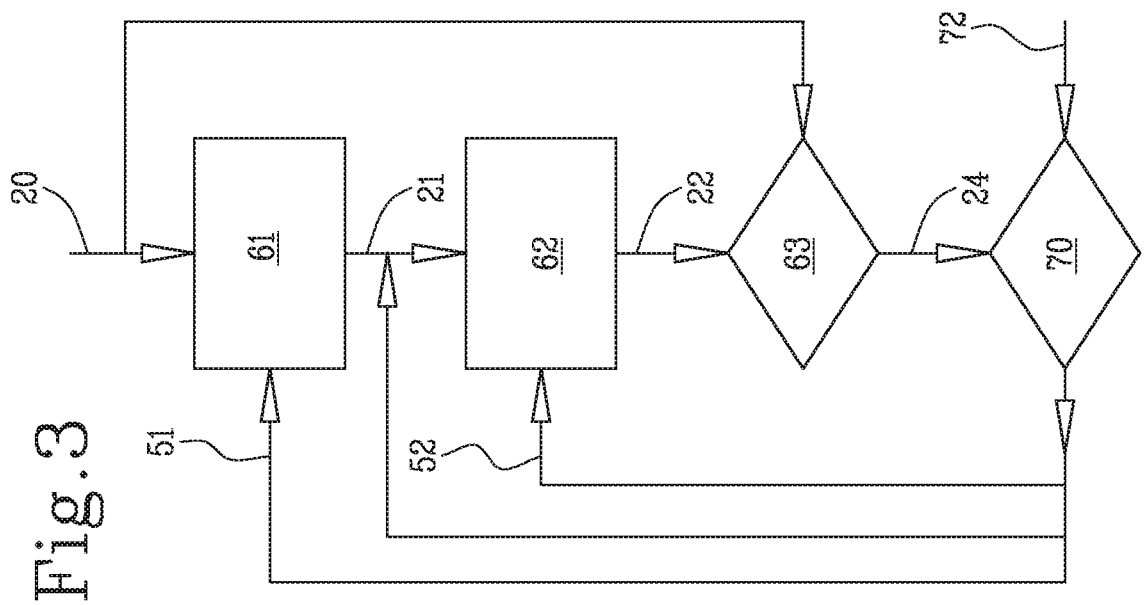
FIG. 3 represents a self-learning process carried out on an image by the optical inspection device of FIG. 1.
Figure 2:
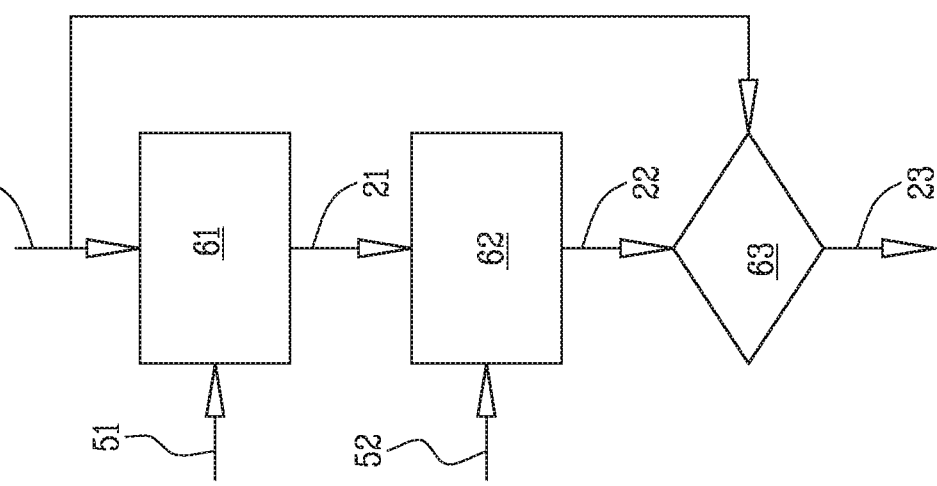
FIG. 2 represents a process an image is subjected to by the optical inspection device of FIG. 1.
Figure 6:
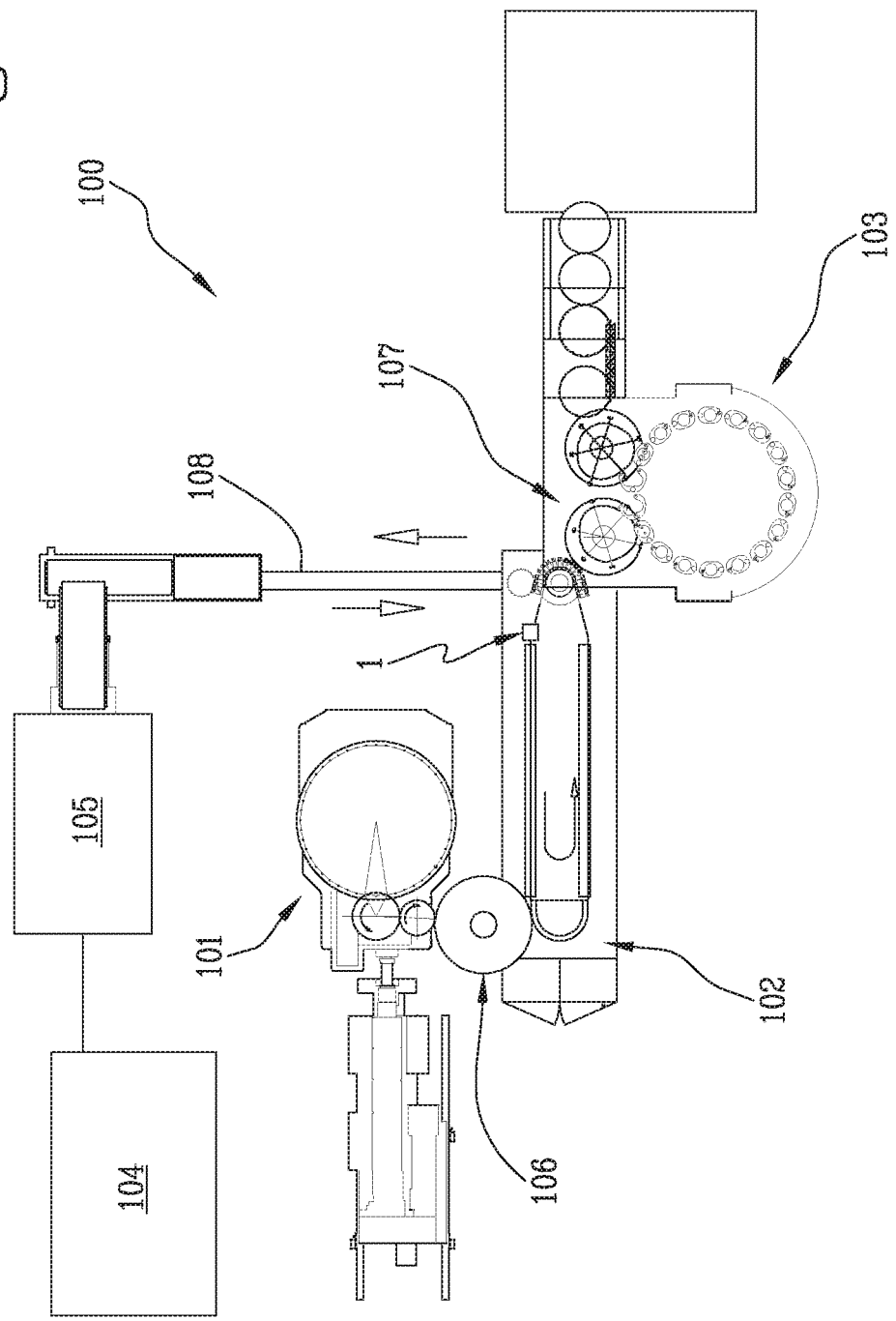
FIG. 6 illustrates a line for making containers of thermoplastic material, comprising the device of FIG. 1.

With reference to the accompanying drawings, the numeral 1 denotes an optical inspection device configured to inspect a parison 2.

The parison 2 includes a body 200 that is substantially cylindrical in shape. The parison 2 (or the body 200) defines an axis of symmetry A. The body 200 is thus cylindrically symmetric about the axis of symmetry A. The parison 2 includes a closed bottom 201. The parison 2 includes a neck 202 defining an opening. The parison 2 includes a ring 203.

The device 1 is configured to receive a parison 2 at an inspection position 10. In an embodiment, the inspection position is defined by an inspection pocket. In an embodiment, the inspection pocket includes a supporting element 11 configured to hold the parison 2 (preferably by supporting the ring 203).

The device 1 includes an illuminator 3. The illuminator 3 includes a light source 31. The light source 31 is configured to emit a beam of light directed at a parison 2 (that is, at an inspection position 10). The illuminator 3 includes an emission-polarizing filter 32. In an embodiment, the emission-polarizing filter 32 is connected to the light source 31. The emission-polarizing filter 32 is configured to intercept the light beam emitted by the light source 31 and to polarize it. Thus, the parison 2 receives a polarized light beam from the emission-polarizing filter 32 and refracts it.

The device 1 includes a detector 4. The detector 4 includes a camera 41. The detector includes a receiving polarizing filter 42. In an embodiment, the receiving polarizing filter 42 is connected to the camera 41. The receiving polarizing filter 42 is configured to receive the light beam refracted by the parison 2 and to polarize it. Thus, the camera 41 receives the beam of light polarized by the emission-polarizing filter 32, refracted by the parison and further polarized by the receiving polarizing filter 42. The camera 41 is configured to capture (or acquire) an image 20 of the parison 2.

The illuminator 3 laterally illuminates the parison 2 on a first side 200A of the body 200. The detector 4 captures a lateral image of the parison 2 on a second side 200B of the body 200, opposite to the first side 200A.

The device 1 includes a memory 5. The memory 5 contains reference data. More specifically, the memory 5 contains at least a first reference data set 51 and a second reference data set 52; in an embodiment, the first reference data set 51 and the second reference data set 52 are distinct from each other.

The device 1 includes a processor 6. The processor 6 is connected to the memory 5. The processor 6 is programmed to process the image 20 captured by the camera 41 based on the reference data sets 51, 52, in order to derive the diagnostic indication 23 regarding the defectiveness of the parison 2. More specifically, the processor 6 is programmed to perform a step 61 of encoding the image 20 as a function of the first reference data set 51 in order to derive values of a plurality of image features 21. The processor 6 is also configured to perform a step 62 of decoding the image features 21, thus generating a reconstructed image 22, based on the second reference data set 52.

The processor 6 is then configured to perform a step 63 of comparing the reconstructed image 20 with the captured image 22 to derive a diagnostic indication 23 regarding the defectiveness of the parison 2.

In an embodiment, the diagnostic indication includes an error map 25 given by a difference between the captured image 20 and the reconstructed image 22 (or vice versa). In an embodiment illustrated in the drawings, the error map 25 presents uniform shading if the parison is good or patched shading if the parison is defective.

In an embodiment, the diagnostic indication 23 includes a similitude parameter 24 whose value is correlated with a degree of similarity between the captured image 20 and the reconstructed image 22. In an embodiment, the processor 6 is programmed to derive the similitude parameter 24 on the basis of the error map 25. In an embodiment, the diagnostic indication 23 includes a binary parameter value indicating whether the parison is good or defective (calculated, for example, by comparing the similitude parameter 24 with a predetermined threshold value).

In an embodiment, the device 1 (or preferably the processing system) comprises a self-learning system 7. The self-learning system 7 is preferably integrated in the processor 6. The self-learning system 7 is connected to the memory 5.

The self-learning system 7 is configured to receive a plurality of captured images 20 for a corresponding plurality of parisons 2. The self-learning system 7 is preferably configured to perform the following steps for each image 20 it receives: 61 encoding the image 20 on the basis of the first reference data set 51, in order to derive a plurality of image features 21; 62 decoding the image features 21, on the basis of the second reference data set 51, to generate a reconstructed image 22; 63 comparing the reconstructed image 22 with the captured image 20 to derive a similitude parameter 24 representing a similarity between the captured image 20 and the reconstructed image 22. 70 evaluating the similitude parameter 24 with respect to a predetermined threshold value 72 for that similitude parameter; updating (iteratively) the first reference data set 51, the second reference data set 52 and the image features 21 until the similitude parameter 24 is above (or below) the threshold parameter 72.

Thus, the self-learning system 7 solves a problem of optimizing the encoding operations 61 and decoding operations 62, where the variables are defined by the first reference data set 51 and by the second reference data set 52 (and, if necessary, by the set of image features 21), in order to minimize the similitude parameter 24, that is, bring it below a certain threshold, (or maximize it, that is, bring it above a certain threshold). Preferably, therefore, the first reference data set 51 and the second reference data set 52 are updated in combination.

Since the self-learning system 7 optimizes the encoding and decoding operations 61 and 62 with images 20 of good parisons 2, the reference data sets 51, 52 (and, if necessary, the set of image features 21) determined as a result of optimization are such that, for good parisons 2, the difference between the captured image 20 and the reconstructed image 22 is minimal. on the other hand, since these operations are not optimized for defective parisons 2, the reconstructed image 22 for a defective parison is significantly different from the captured image 20 and the processor 6 (acknowledging that difference) generates a diagnostic indication 23 signifying that the parison is defective.

Preferably, the steps 61 of encoding, 62 decoding, 63 comparing, 70 evaluating and updating the reference data sets 51, 52 (and, if necessary, the image features 21) are performed iteratively by the self-learning system 7 for each image 20 in succession (that is, all the iterations necessary for minimizing or maximizing the similitude parameter 24 are first performed for a first parison 2, then for a second parison 2 and so on). In an embodiment, the self-learning system might also perform a first iteration in which it performs the steps 61 of encoding, 62 decoding, 63 comparing and 70 evaluating for all the images 20; then, starting from the similitude parameters 24 obtained for all the parisons 2, it updates the reference data sets 51, 52 (and, if necessary, the image features 21) and continues with a second iteration in which it again performs the steps 61 of encoding, 62 decoding, 63 comparing and 70 evaluating for all the images 20, and so on.

This disclosure also relates to a line 100 for making containers of thermoplastic material—for example, bottles.

The line 100 comprises a moulding machine 101 configured to make (that is, to mould) parisons 2. In an embodiment, the moulding machine 101 is a rotary machine. The line 100 also comprises a heating oven 102 configured to receive the moulded parisons 2 and to heat them. The line 100 comprises a blow-moulding machine 103 configured to blow-mould the parisons 2 so as to make the containers. In an embodiment, the blow-moulding machine 103 is a rotary machine.

Preferably, the line 100 includes a first transfer carousel 106 configured to transfer the parisons 2 from the moulding machine 101 to the heating oven 102. Preferably, the line 100 includes a second transfer carousel 107 configured to transfer the parisons 2 from the heating oven 102 to the blow-moulding machine 103. In an embodiment, the line 100 includes a storage unit 104 for storing the moulded parisons 2 before they are blow-moulded. In an embodiment, the line 100 includes a parison orienting device 105 configured to orient the parisons 2 leaving and/or entering the storage unit 104. In an embodiment, the line 100 includes a conveyor 108 configured to convey the parisons 2 into and/or out of the storage unit 104. The conveyor 108 feeds the parisons 2 from the storage unit 104 to the heating oven 102.

The invention claimed is:

1. A device for optical inspection of parisons, comprising:
an illuminator including a light source configured to emit a beam of light directed towards a parison located at an inspection position; and
a detector including a camera configured to capture an image of the parison located at the inspection position, wherein the parison, at the inspection position, is operatively interposed between the illuminator and the detector,
the illuminator including an emission-polarizing filter configured to intercept the beam of light emitted by the light source and to generate a polarized light beam, and in that the detector includes a receiving polarizing filter configured to receive the polarized light beam, so that the parison, at the inspection position, is operatively interposed between the emission-polarizing filter and the receiving polarizing filter,
the device for optical inspection of parisons further comprising
a self-learning system; and
a processing unit including
a memory including reference data sets, and
a processor programmed to process the image captured by the detector based on the reference data sets in order to derive a diagnostic indication regarding a defectiveness of the parison, so that the diagnostic indication distinguishes between a with-defect typology of objects and a defect-free typology of objects, the processing unit being trained, by the self-learning system, through samples of objects of the defect-free typology;
wherein the processing unit is configured
to process the image captured by the detector based on the reference data sets in order to derive from the image values of a plurality of image features,
to process the values of the plurality of image features to derive the diagnostic indication regarding the defectiveness of the parison,
to generate an image reconstructed from the values of the plurality of image features and based on the reference data sets, and
to derive the diagnostic indication regarding the defectiveness of the parison as a function of comparing the image captured by the detector with the reconstructed image.

2. The device according to claim 1, wherein the self-learning system is configured
to receive as input a plurality of images captured by the detector for a corresponding plurality of parisons;
to process each image of the plurality of images captured by the detector based on the reference data sets, in order to derive for each image corresponding values for the plurality of image features based on a predetermined criterion;
to generate for each image of the plurality of images a corresponding reconstructed image, based on the reference data sets, using the corresponding derived values for the plurality of image features;
to compare each image of the plurality of images captured by the detector with the corresponding reconstructed image in order to derive, for each image of the plurality of images, a corresponding similitude parameter representing a similarity between the image captured by the detector and the corresponding reconstructed image; and
for each image of the plurality of images, to update the reference data set as a function of the similitude parameter and of a predetermined threshold value for the similitude parameter.

3. The device according to claim 2, wherein the self-learning system is configured to update the plurality of image features as a function of the similitude parameter and of the predetermined threshold value.

4. The device according to claim 2, wherein the predetermined criterion includes a maximum number of image features for the plurality of image features.

5. The device according to claim 2, wherein the self-learning system includes convolutional neural networks.

6. The device according to claim 5, wherein the convolutional neural networks is configured to encode images through a series of convolution steps alternated with a series of pooling steps to derive the values of the plurality of image features.

7. The device according to claim 1, wherein the emission-polarizing filter is a linear filter, configured to polarize the light in a first polarizing direction.

8. The device according to claim 1, wherein the receiving-polarizing filter is a linear filter, configured to polarize the light in a second polarizing direction.

9. The device according to claim 8, wherein the self-learning system includes convolutional neural networks.

10. The device according to claim 1, wherein the parisons are made of PET and wherein the image captured by the detector includes a colour pattern representing a stress which the polymer chains of the PET are subjected to.

11. A line for making containers of thermoplastic material, comprising:
either one of i) a moulding machine configured to make parisons, or ii) a blow-moulding machine configured to receive the parisons and to blow-mould them in moulds to make the containers, and a device for optical inspection of parisons, the device for optical inspection of parisons including
   an illuminator including a light source configured to emit a beam of light directed towards a parison located at an inspection position; and
   a detector including a camera configured to capture an image of the parison located at the inspection position, wherein the parison, at the inspection position, is operatively interposed between the illuminator and the detector,
   the illuminator including an emission-polarizing filter configured to intercept the beam of light emitted by the light source and to generate a polarized light beam, and in that the detector includes a receiving polarizing filter configured to receive the polarized light beam, so that the parison, at the inspection position, is operatively interposed between the emission-polarizing filter and the receiving polarizing filter,
the device for optical inspection of parisons further comprising
   a self-learning system; and
   a processing unit including
      a memory including reference data sets, and
      a processor programmed to process the image captured by the detector based on the reference data sets in order to derive a diagnostic indication regarding a defectiveness of the parison, so that the diagnostic indication distinguishes between a with-defect typology of objects and a defect-free typology of objects, the processing unit being trained, by the self-learning system, through samples of objects of the defect-free typology;
   wherein the processing unit is configured
      to process the image captured by the detector based on the reference data sets in order to derive from the image values of a plurality of image features,
      to process the values of the plurality of image features to derive the diagnostic indication regarding the defectiveness of the parison,
      to generate an image reconstructed from the values of the plurality of image features and based on the reference data sets, and
      to derive the diagnostic indication regarding the defectiveness of the parison as a function of comparing the image captured by the detector with the reconstructed image; and
   wherein the optical inspection device is operatively located either i) downstream of the moulding machine, or ii) upstream of the blow-moulding machine.

12. A method for optical inspection of parisons, comprising the following steps:
   emitting a beam of light directed towards a parison located at an inspection position, by means of an illuminator including a light source;
   capturing, with a detector including a camera, an image of the parison located at the inspection position, wherein the parison, at the inspection position, is operatively interposed between the illuminator and the detector;
   generating a polarized light beam by intercepting the beam of light emitted by the illuminator on an emission-polarizing filter interposed between the light source and the parison; and
   receiving the beam of polarized light on a receiving polarizing filter, interposed between the parison and the camera;
   wherein, at the inspection position, the parison is operatively interposed between the emission-polarizing filter and the receiving polarizing filter;
   the method for optical inspection of parisons further comprising a step of processing the image that includes sub-steps of
      processing the image captured by the detector based on the reference data sets, in order to derive from the image values of a plurality of image features;
      generating an image reconstructed from the values of the plurality of image features and based on the reference data sets;
      deriving a diagnostic indication regarding a defectiveness of the parison as a function of comparing the image captured by the detector with the reconstructed image; and
      training the processing unit through a self-learning system, so that the diagnostic indication distinguishes between a with-defect typology of objects and a defect-free typology of objects, the processing unit being trained, by the self-learning system, through samples of objects of the defect-free typology.

13. The method according to claim 12, wherein the step of self-learning comprises the following sub-steps:
   capturing a plurality of images for a corresponding plurality of parisons;
   processing each image of the plurality of images based on the reference data sets, in order to derive from each image of the plurality of images corresponding values of a plurality of image features as a function of a predetermined criterion;
   generating for each image of the plurality of images a corresponding reconstructed image using the corresponding values of the plurality of image features and based on the reference data sets;
   comparing each image of the plurality of images with the corresponding reconstructed image and deriving a corresponding similitude parameter representing a similarity between the image captured by the detector and the corresponding reconstructed image; and
   updating the reference data sets and the plurality of image features as a function of the similitude parameter and of a predetermined threshold value.

14. The method according to claim 13, wherein the images of the plurality of images captured by the camera during the step of self-learning are representative of a corresponding plurality of defect-free parisons.

15. The method according to claim 13, comprising a step of feeding the parisons of the plurality of parisons to the inspection position one at a time, and according to a predetermined orientation relative to the emission-polarizing filter and relative to the receiving polarizing filter.

16. The method according to claim 12, wherein the emission-polarizing filer is a linear polarizing filter, configured to polarize the light in a first polarizing direction.

17. The method according to claim 16, wherein the parison, at the inspection position, is oriented with a respective axis parallel to the first polarizing direction.

18. The method according to claim 16, wherein the receiving polarizing filter is a linear polarizing filter, configured to polarize the light in a second polarizing direction, different from the first polarizing direction.

19. A method for processing an image of a parison, captured by a detector, the method comprising the following steps:
- processing the image captured by the detector based on the reference data sets, in order to derive from the image values of a plurality of image features;
- generating an image reconstructed from the values of the plurality of image features and based on the reference data sets;
- deriving a diagnostic indication regarding the defectiveness of the parison as a function of comparing the image captured by the camera with the reconstructed image; and
- self-learning, comprising the following sub-steps:
  - capturing a plurality of images for a corresponding plurality of parisons;
  - processing each image of the plurality of images based on the reference data sets, in order to derive from each image of the plurality of images corresponding values of a plurality of image features on the basis of a predetermined criterion;
  - generating for each image of the plurality of images a corresponding reconstructed image using the corresponding values of the plurality of image features and based on the reference data sets;
  - comparing each image of the plurality of images with the corresponding reconstructed image and deriving a corresponding similitude parameter representing a similarity between the image captured by the detector and the corresponding reconstructed image;
  - updating the reference data sets and the plurality of image features as a function of the similitude parameter and of a predetermined threshold value; and
  - training the processing unit through a self-learning system, so that the diagnostic indication distinguishes between a with-defect typology of objects and a defect-free typology of objects, the processing unit being trained, by the self-learning system, through samples of objects of the defect-free typology.

20. A method for processing an image of an object made of plastic material, the image being captured by a detector, the method comprising the following steps:
- processing the image captured by the detector based on reference data sets, to derive from the image values of a plurality of image features;
- generating an image reconstructed from the values of the plurality of image features and based on the reference data sets;
- deriving a diagnostic indication regarding a defectiveness of the object, as a function of comparing the image captured by the detector with the reconstructed image; and
- self-learning through the following sub-steps:
  - capturing a plurality of images for a corresponding plurality of objects;
  - processing each image of the plurality of images based on the reference data sets, to derive from each image of the plurality of images corresponding values of a plurality of image features on the basis of a predetermined criterion;
  - generating, for each image of the plurality of images, a corresponding reconstructed image using the corresponding values of the plurality of image features and based on the reference data sets;
  - comparing each image of the plurality of images with the corresponding reconstructed image and deriving a corresponding similitude parameter representing a similarity between the image captured by the detector and the corresponding reconstructed image;
  - updating the reference data sets and the plurality of image features as a function of the similitude parameter and of a predetermined threshold value, and
  - training the processing unit through a self-learning system, so that the diagnostic indication distinguishes between a with-defect typology of objects and a defect-free typology of objects, the processing unit being trained, by the self-learning system, through samples of objects of the defect-free typology.

21. The method according to claim 20, wherein, in the step of self-learning, also the plurality of image features are updated as a function of the similitude parameter and of the predetermined threshold value.

22. The method according to claim 20, wherein the predetermined criterion includes a maximum number of image features for the plurality of image features.

23. The method according to claim 20, wherein the self-learning step includes using convolutional neural networks.

24. The method according to claim 20, wherein the images of the plurality of images captured by the detector during the step of self-learning are representative of a corresponding plurality of defect-free objects.

25. The method according to claim 20, wherein the objects are preforms or parisons.

26. A device for optical inspection of objects made pf plastic material, comprising:
- an illuminator including a light source configured to emit a beam of light directed towards a parison located at an inspection position;
- a detector including a camera configured to capture an image of the object located at the inspection position, wherein the object, at the inspection position, is operatively interposed between the illuminator and the detector,
- a processing unit including a memory, containing reference data, and a processor, programmed to process the image captured by the detector, based on the reference data, to derive from the captured image values of a plurality of image features, and to process the values of the plurality of image features, to derive a diagnostic information regarding a defectiveness of the object,
- the processing unit being configured for generating an image reconstructed, from the values of the plurality of image features and based on the reference data sets, and for deriving the diagnostic indication regarding the defectiveness of the object as a function of comparing the image captured by the detector with the reconstructed image; and
- a self-learning system configured
  - to receive as input a plurality of images captured by the detector for a corresponding plurality of objects;
  - to process each image of the plurality of images captured by the detector based on the reference data sets, in order to derive for each image corresponding values for the plurality of image features based on a predetermined criterion;
  - to generate for each image of the plurality of images a corresponding reconstructed image, based on the reference data sets, using the corresponding derived values for the plurality of image features;
  - to compare each image of the plurality of images captured by the detector with the corresponding reconstructed image in order to derive, for each image of the plurality of images, a corresponding similitude parameter representing a similarity between the image captured by the detector and the corresponding reconstructed image; and for each image of the plurality of images, to update the reference data sets as a function of the similitude parameter and of a predetermined threshold value for the similitude parameter, the self-learning system being programmed to train the processing unit so that the diagnostic indication distinguishes between a with-defect typology of objects and a defect-free typology of objects, the processing unit being trained, by the self-learning system, through samples of objects of the defect-free typology.

* * * * *